United States Patent
Gerlach et al.

(10) Patent No.: US 7,974,652 B2
(45) Date of Patent: Jul. 5, 2011

(54) METHOD FOR UPLINK INTERFERENCE COORDINATION ON DEMAND BASIS WITH CELL IDENTIFICATION, INTER-CELL INTERFERENCE DETECTION AND DOWNLINK MEASUREMENT, A BASE STATION, A MOBILE TERMINAL AND A MOBILE NETWORK THEREFOR

(75) Inventors: Christian Georg Gerlach, Ditzingen (DE); Bernd Haberland, Stuttgart (DE)

(73) Assignee: Alcatel Lucent, Paris (FR)

( * ) Notice: Subject to any disclaimer, the term of this patent is extended or adjusted under 35 U.S.C. 154(b) by 826 days.

(21) Appl. No.: 11/452,262

(22) Filed: Jun. 14, 2006

(65) Prior Publication Data

US 2007/0004423 A1   Jan. 4, 2007

(30) Foreign Application Priority Data

Jun. 15, 2005   (EP) .................................. 05291287

(51) Int. Cl.
*H04B 7/00* (2006.01)
(52) U.S. Cl. ........................................................ 455/522
(58) Field of Classification Search .................. 455/522, 455/450

See application file for complete search history.

(56) References Cited

U.S. PATENT DOCUMENTS

| | | | | |
|---|---|---|---|---|
| 5,649,292 A | * | 7/1997 | Doner | 455/447 |
| 5,740,208 A | * | 4/1998 | Hulbert et al. | 375/346 |
| 6,628,632 B1 | * | 9/2003 | Dolan | 370/332 |
| 7,227,850 B2 | | 6/2007 | Dahlman et al. | |
| 7,437,164 B2 | * | 10/2008 | Agrawal et al. | 455/446 |
| 2002/0145988 A1 | * | 10/2002 | Dahlman et al. | 370/335 |
| 2005/0096062 A1 | * | 5/2005 | Ji et al. | 455/450 |

FOREIGN PATENT DOCUMENTS

| | | |
|---|---|---|
| EP | 0 865 220 | 9/1998 |
| EP | 0865220 09 | 9/1998 |
| EP | 1418776 A1 | 5/2004 |
| WO | 02/082684 | 10/2002 |
| WO | WO 02/082684 A2 | 10/2002 |
| WO | WO 2005/043948 A2 | 5/2005 |

OTHER PUBLICATIONS

Kim W S et al: "Enhanced Capacity in CDMA Systems with Alternate Frequency Planning." 1998, pp. 973-978, XP010284782.

(Continued)

*Primary Examiner* — Lewis G West
*Assistant Examiner* — David Bilodeau
(74) *Attorney, Agent, or Firm* — Fay Sharpe LLP

(57) ABSTRACT

The invention concerns a method for coordination of the interference in the uplink between cells (B1,B2) of a single frequency network with the frequency band used for uplink being subdivided into at least two subsets(F1 F2. . . FR), whereby a resource related to a dedicated subset is allocated to a mobile terminal (T1) located in a first cell (B1) of said cells in the border area to a neighbor cell (B2-B4), the based station of the cell (B2) with the highest interference damage caused by the mobile terminal (T1) accepts a high interference level on said dedicated subset dependent on network criteria, and the usage of said dedicated subset in the cell (B2) with the highest interference damage caused by the mobile terminal (T1) is restricted under observation of the interference level, a base station, a mobile terminal and a mobile network therefor.

10 Claims, 3 Drawing Sheets

OTHER PUBLICATIONS

Hamidian K et al: "Performance Analysis of a CDMA/FDMA Cellular Communication System with Cell Splitting." 1997, pp. 545-550, XP010241411.

LG Electronics: "Further Aspects of Interference Coordination." 3GPP TSG RAN WG1 LTE, Jan. 23-25, 2006.

Alcatel: "Multi-cell Simulation Results for Interference Co-ordination in new OFDM DL." 3GPP TSG RAN WG1 #42, Sep. 2005, pp. 1-11.

Wolfgang Zirwas: "Synchronization of Single Frequency Networks.".

U.S. Appl. No. 11/451,497, filed Jun. 13, 2006, entitled "Method for Uplink Interference Coordination in Single Frequency Networks, a Base Station, a Mobile Terminal and a Mobile Network Therefor".

3GPP: "OFDM with interference control for improved HSDPA coverage," 3GPP TSG RAN WGI Meeting #37, May 2004, pp. 1-11, XP002310556.

Kim, et al., Enhanced Capacity in CDMA Systems with Alternate Frequency Planning, Communications IEEE, 1998, pp. 973-978.

Hamidian, et al., Performance Analysis of a CDMA/FDMA Cellular Communication System with Cell Splitting, IEEE, 1997, pp. 545-550.

Zirwas, W. et al., Synchronization of Single Frequency Networks, Siemens AG, http://www.comnets.rwthaachen.de/fileadmin/forschung/OldProjects/cover/publications/OFDM%20FG%202001.pdf (Jan. 13, 2003).

LG Electronics: "Further Aspects of Interference Coordination," 3GPP TSG RAN WG1 LTE, Jan. 23-25, 2006.

Alcatel: "Multi-cell Simulation Results for Interference Co-ordination in new OFDM DL." 3GPP TSG RAN WG1 #42, London, UK, pp. 1-11, Aug. 29-Sep. 2, 2005.

* cited by examiner

US 7,974,652 B2

METHOD FOR UPLINK INTERFERENCE COORDINATION ON DEMAND BASIS WITH CELL IDENTIFICATION, INTER-CELL INTERFERENCE DETECTION AND DOWNLINK MEASUREMENT, A BASE STATION, A MOBILE TERMINAL AND A MOBILE NETWORK THEREFOR

The invention is based on a priority application EP·05291287.0 which is hereby incorporated by reference.

FIELD OF THE INVENTION

The invention relates to a method for coordination of the interference in the uplink between cells of a single frequency network with the frequency band used for uplink being subdivided into at least two subsets, wherein
  a resource related to a dedicated subset is allocated to a mobile terminal located in a first cell of said cells in the border area to a neighbor cell,
  the base station of the cell with the highest interference damage caused by the mobile terminal accepts a high interference level on said dedicated subset dependent on network criteria,
  and the usage of said dedicated subset in the cell with the highest interference damage caused by the mobile terminal is restricted under observation of the interference level,
a base station for coordination of the interference in the uplink between cells of a single frequency network with the frequency band used for uplink being subdivided into at least two subsets wherein
  the base station comprises means for asking another base station to give away a resource,
  and said base station comprises means for scheduling said resource to a mobile terminal that said base station serves,
a mobile terminal for coordination of the interference in the uplink between cells of a single frequency network with the frequency band used for uplink being subdivided into at least two subsets wherein
  the mobile terminal comprises means for evaluating in which cell it creates interferences by means of downlink interference or path loss measurements,
  and the mobile terminal comprises means for signaling to its serving base station said measurements or results deduced from said measurements
and a mobile network comprising base stations for coordination of the interference in the uplink between cells of a single frequency network with the frequency band used for uplink being subdivided into at least two subsets wherein
  the base station comprises means for asking another base station to give away a resource,
and said base station comprises means for scheduling said resource to a mobile terminal that said base station serves for performing a method for coordination of the interference in the uplink between cells of a single frequency network with the frequency band used for uplink being subdivided into at least two subsets, wherein
  a resource related to a dedicated subset is allocated to a mobile terminal located in a first cell of said cells in the border area to a neighbor cell,
  the base station of the cell with the highest interference damage caused by the mobile terminal accepts a high interference level on said dedicated subset dependent on network criteria,
  and the usage of said dedicated subset in the cell with the highest interference damage caused by the mobile terminal is restricted under observation of the interference level.

BACKGROUND OF THE INVENTION

Orthogonal uplink transmission schemes such as Orthogonal Frequency Division Multiplexing (OFDM), single carrier Frequency Division Multiple Access (FDMA) or distributed FDMA such as interleaved FDMA with multiple terminals will become increasingly important e.g. for future evolutions of air interfaces for mobile radio systems. These radio systems are currently under discussion e.g. in Third Generation Partnership Project (3GPP) Technical Specification Group (TSG) Radio Access Network (RAN), for Wireless Local Area Networks (WLANs) e.g. according to standard IEEE 802.11a, or for a $4^{th}$ generation air interface.

Given the licensed bandwidth, transmission capacity from network providers e.g. for picture uploading or video communication has to be as high as possible for all users to serve as many subscribers as possible. Further the quality of service experienced by the user and especially the coverage of the service is an important property demanded by the user. So an uplink access scheme shall work well at the cell borders of a single frequency network (SFN).

In cellular systems with a frequency reuse factor of 1 the signal to interference ratio at the cell border can approach the factor 1 or 0 dB, so that no useful transmission from a mobile terminal to the base station can be kept up if a mobile terminal from a neighboring cell is near to the considered mobile terminal and sends with the same power on the same frequencies.

Therefore in CDMA (CDMA=Code Division Multiple Access) a soft handover exists and the mobile terminals always use a different (terminal specific) scrambling code in the uplink. The reception is then possible using the spreading gain from CDMA. As is known due to the strong interference the uplink capacity is considerably limited.

In OFDM transmission, frequency groups are allocated to a mobile terminal instead of codes in CDMA transmission. In other FDMA orthogonal uplink schemes, frequencies are also allocated in the uplink to a mobile terminal. So in these schemes in contrast to CDMA transmission, interference can be planned and avoided. For these orthogonal uplink transmission schemes the problem at the cell border has to be solved as well.

Up to now, frequency planning for the cells is possible by means of giving each whole cell a distinct frequency band.

However, frequency distribution to the different cells reduces the available uplink resources per cell very considerably e.g. by a factor of ⅓ or ⅐ and thus the overall system throughput. It is a waste of resources for the inner area of a cell.

A frequency reuse of e.g. ⅓ only in the outer part of the cell is possible but still wastes too much resources.

SUMMARY OF THE INVENTION

The object of the invention is to propose a method for coordination of the interference in the uplink between cells of a single frequency network offering a good usage of the available uplink resources.

This object is achieved by a method between cells of a single frequency network with the frequency band used for uplink being subdivided into at least two subsets, wherein a resource related to a dedicated subset is allocated to a mobile terminal located in a first cell of said cells in the border area to a neighbor cell, the base station of the cell with the highest interference damage caused by the mobile terminal accepts a high interference level on said dedicated subset dependent on network criteria, and the usage of said dedicated subset in the cell with the highest interference damage caused by the mobile terminal is restricted under observation of the interference level, a base station for coordination of the interference in the uplink between cells of a single frequency network with the frequency band used for uplink being subdivided into at least two subsets wherein the base station comprises means for asking another base station to give away a resource, and said base station comprises means for scheduling said resource to a mobile terminal that said base station serves, a mobile terminal for coordination of the interference in the uplink between cells of a single frequency network with the frequency band used for uplink being subdivided into at least two subsets wherein the mobile terminal comprises means for evaluating in which cell it creates interferences by means of downlink interference or path loss measurements, and the mobile terminal comprises means for signaling to its serving base station said measurements or results deduced from said measurements and a mobile network comprising base stations for coordination of the interference in the uplink between cells of a single frequency network with the frequency band used for uplink being subdivided into at least two subsets wherein the base station comprises means for asking another base station to give away a resource, and said base station comprises means for scheduling said resource to a mobile terminal that said base station serves for performing a method for coordination of the interference in the uplink between cells of a single frequency network with the frequency band used for uplink being subdivided into at least two subsets, wherein a resource related to a dedicated subset is allocated to a mobile terminal located in a first cell of said cells in the border area to a neighbor cell, the base station of the cell with the highest interference damage caused by the mobile terminal accepts a high interference level on said dedicated subset dependent on network criteria, and the usage of said dedicated subset in the cell with the highest interference damage caused by the mobile terminal is restricted under observation of the interference level.

The main idea of the invention is to dynamically distribute the resources between neighbored cells on demand in order to achieve interference coordination.

The uplink frequency band is partitioned in a number of disjoint subsets, and there is almost no interference between the different subsets.

An uplink channel is designed so that mobile terminals that are interfering on other base stations are identified, e.g. by cell specific pilots, and recorded. If e.g. a mobile terminal transmits to its base station and moves to the cell border of a neighbor cell, the base station of the neighbor cell senses the interference and sends a report to the serving base station of the mobile terminal. The reports about the damage by interference are gathered and evaluated in the serving base station and the mobile terminal's uplink is scheduled by the serving base station.

If the mobile terminal is at the cell border to the neighbor cell, it may need additional resources. So the serving base station of the mobile terminal asks the base station of the neighbor cell if it can give away a resource in a big outer part of the cell.

If the base station of the neighbor cell accepts the request taking into account further factors, it decides e.g. to accept a restriction in one dedicated subset. So a dedicated subset is given to the serving base station for its mobile terminal. The interference in the dedicated subset in the neighbor cell is accepted. Mobile terminals from the neighbor cell that are measured to interfere on the serving base station get a power limitation in the dedicated subset to avoid the interference on the serving base station.

The serving base station can further remove the interference from multiple surrounding cells in the dedicated subset by asking further base stations for imposing a power limitation in the dedicated subset for mobile terminals that are near to the cell border of the cell of the serving base station and are measured to interfere.

So the signal to noise ratio in the dedicated subset is improved and it can be used for uplink scheduling of the mobile terminal.

If the resource related to the dedicated subset is not needed or the mobile terminals of the neighbor cell do not interfere any longer the restrictions are lifted again and the resource is given back.

This way the resources can be dynamically distributed and an interference coordination on demand can be achieved.

If a mobile terminal in the neighbor cell is also at the cell border the mechanism can also be applied the other way round, so that e.g. in the end the whole frequency band will be distributed between the two mobile terminals in adjacent cells e.g. as one half of the subsets for each mobile terminal.

In order to avoid extensive signaling, e.g. of interference damage reports, in an embodiment of the invention, the mobile terminals can also on their own predict in advance where they will create damage based on the approximation that their downlink interference or path loss measurement is reciprocal to their uplink interference generation. The mobile terminal will then demand appropriate uplink scheduling to avoid interfering in the restricted frequency group, i.e. subset. This also results in a reduction of the measured uplink interference on the dedicated subset in the considered base station.

If in case of receive diversity, i.e. beamforming, the interference is seen only from one or few interfering mobile terminals, the base station can also try to evade the interference and try to schedule its mobile terminal on a less disturbed subset which is in principle the same as adaptive subcarrier allocation.

Further developments of the invention can be gathered from the dependent claims and the following description.

BRIEF DESCRIPTION OF THE DRAWINGS

In the following the invention will be explained further making reference to the attached drawings.

DETAILED DESCRIPTION OF THE INVENTION

A mobile network according to the invention comprises mobile terminals and base stations.

Each of said mobile terminals is connected to at least one of said base stations, and the base stations are in turn connected via base station controllers to a core network.

The mobile terminals comprise the functionality of a mobile terminal for transmission and reception in a single frequency network as e.g. an OFDM network, i.e. they can be connected to a mobile network by means of a base station.

Furthermore, a mobile terminal according to the invention comprises means for evaluating in which cell or region of a cell it creates interferences by means of downlink interference or path loss measurements, and the mobile terminal comprises means for signaling to its serving base station said measurements or results deduced from said measurements.

The base stations comprise the functionality of a base station of a single frequency network as e.g. a WLAN or an OFDM network, i.e. they provide the possibility for mobile terminals to get connected to the mobile network.

Furthermore, the base station according to the invention comprises means for asking another base station to give away a resource, and for scheduling said resource to a mobile terminal that said base station serves.

In an embodiment of the invention, the base station according to the invention comprises means for identifying by means of dedicated cell specific signals, like e.g. pilots or training sequences, transmitted from mobile terminals from which other cell an interference stems from, for sending to the base station of the cell from which said interference stems from a notification about the interference, and for finding out by means of its history or further information about its terminal such as geographic information from which mobile terminal the interference was caused.

In the following, by way of example the method according to the invention is described in detail making reference to FIGS. 1 to 4.

The method according to the invention is described for an OFDM transmission for UTRAN enhancement (UTRAN=Universal Mobile Telecommunication System Terrestrial Radio Access Network), but the invention could also be used e.g. for a single carrier system with cyclic prefix and frequency domain equalization or other FDMA system, where the different carriers are distributed to the mobile terminals.

Figure 1:
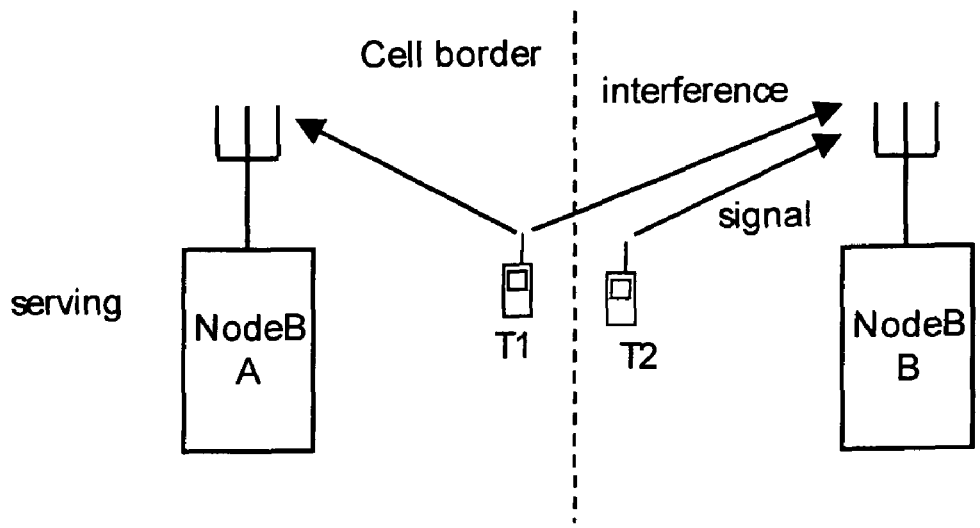
FIG. 1 schematically shows the interference situation in the uplink at the border between two cells in a single frequency network.

FIG. 1 shows the interference situation in the uplink in a single frequency multi cell OFDM network that comprises by way of example two base stations NodeB A and NodeB B and two mobile terminals T1 and T2.

The mobile terminal T1 is connected to the base station NodeB A, i.e. the base station NodeB A is the serving base station for the mobile terminal T1 which is depicted by an arrow from the mobile terminal T1 to the base station NodeB A. As the mobile terminal T2 is located near the cell border of the cell that is served by the base station NodeB A, which is depicted by a dotted line, the base station NodeB A notices interference from mobile terminal T2, which is depicted by an arrow from the mobile terminal T2 to the base station NodeB A.

If synchronization for the cells can not be assumed, interference avoidance has to be based only on distribution of different frequencies and not on distribution of different time slots.

For wideband CDMA (WCDMA) transmission in UMTS (UMTS=Universal Mobile Telecommunication System), resources that are allocated to the mobile terminals are never without interference, so there is no particular problem for a mobile terminal when entering a new cell to still go on using its scrambling and channelization code.

In OFDM as in CDMA transmission also soft handover using diversity could be performed for mobile terminals in the overlapping region of two cells. But in OFDM in contrast to CDMA transmission, the used carrier signals are strictly orthogonal. So if a mobile terminal T2 uses a resource in cell B and enters into cell A, these resources are usually already taken by one or multiple other mobile terminals in cell A. These one or multiple other mobile terminals are now disturbed by the interference of mobile terminal T2. If there is exactly one disturbed mobile terminal, the two competing mobile terminals could be distinguished by the channel coding which means that the interference would again be spread and this limits the channel capacity for both.

The task is now to find a solution for such an OFDM or single carrier system with frequency domain equalization to work with frequency reuse of 1 and preferably without soft handover and coordinate the interference in uplink.

Figure 2:
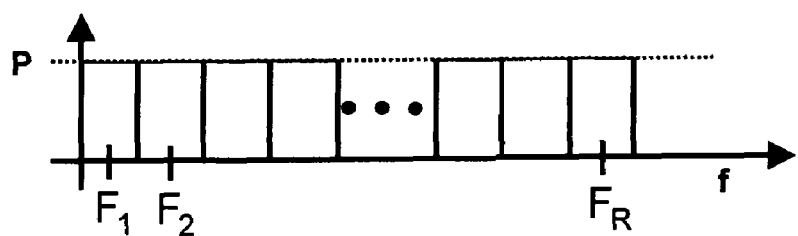
FIG. 2 schematically shows the partitioning of an OFDM or single carrier FDMA frequency band in disjoint subsets in uplink.

The invention is based on partitioning the frequency band into subsets. FIG. 2 shows in the upper part a number of R disjoint subsets F1, F2 . . . FR along the frequency axis f. In our example, all these subsets can have the same maximum power value along the power axis p, i.e. all subsets are used with the same maximum power. These subsets may contain frequency diverse frequency patterns to be robust against a frequency selective fading channel. For simplicity they are depicted as blocks over the frequency axis f as given in FIG. 2.

Figure 3:
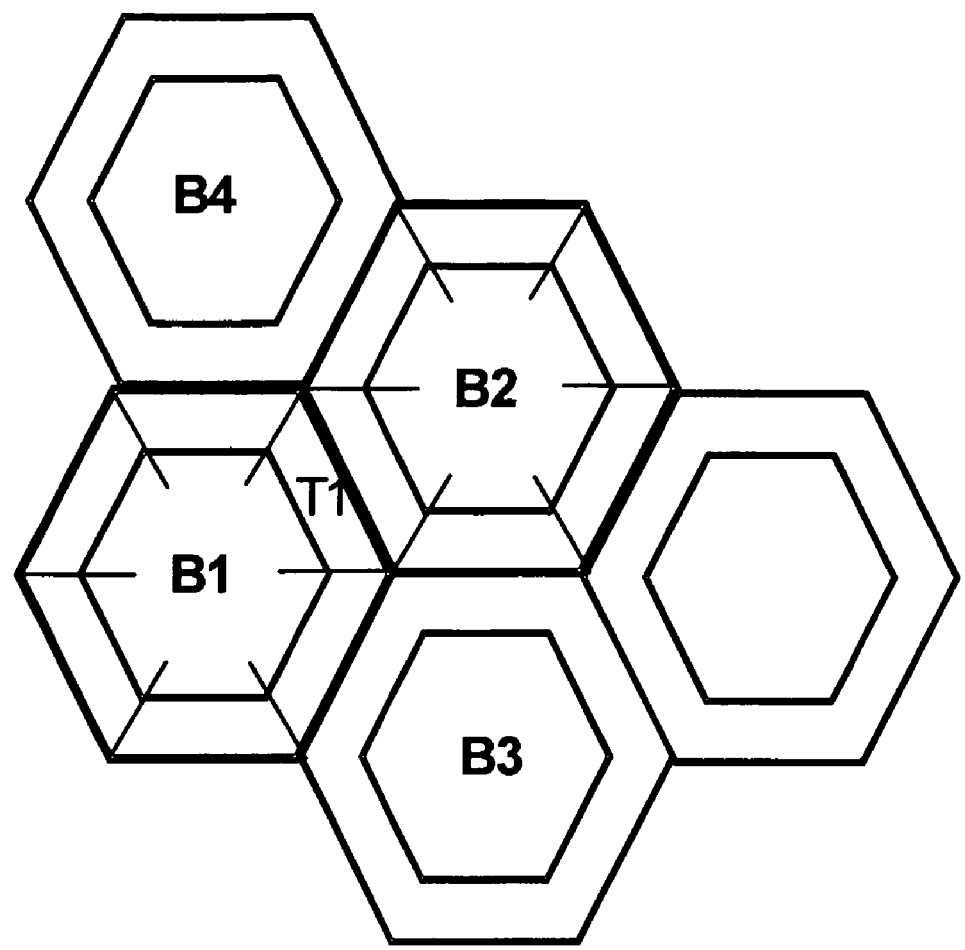
FIG. 3 schematically shows a hexagonal cell pattern with a mobile terminal in the border area.

The method for coordination of the interference according to the invention is illustrated by way of example for hexagonal cells as given in FIG. 3. The cells are denoted B1-B4 and have an inner area and a border area. A mobile terminal T1 is located in the border area of cell B1 and is served by the base station of cell B1.

When a mobile terminal approaches a cell border, as e.g. the mobile terminal T1 in FIG. 3, the problem of inter-cell interference arises. This problem depends on with which power in uplink a mobile terminal is capable or scheduled to send.

If in case of OFDM transmission the mobile terminals in a cell use different frequency patterns. i.e. subsets, to achieve multiplexing of the mobile terminals, each subset or mobile terminal must have a specific pilot so that the base station is capable to do channel equalization for each mobile terminal individually.

If a mobile terminal uses a certain subset for data transmission to its base station, the certain subset is also used in the neighbor cell for another uplink connection. So e.g. if the mobile terminal T2 in FIG. 1 uses a certain subset to send to the base station NodeB B and near to the cell border of the cell the mobile terminal T1 in a neighbor cell also uses the certain subset to transmit to the base station NodeB A, the base station NodeB B experiences interference from mobile terminal T1 if it tries to receive the frequency pattern from its client mobile terminal T2.

In an embodiment of the invention, the base station NodeB B identifies from which cell's mobile terminals in one time-frequency or frequency pattern the e.g. strongest interference stems from. This can be realized e.g. by positioning terminal pilots in the time-frequency or frequency patterns at positions that are cell specific and differ between neighbor cells. This is sketched in FIG. 4.

Figure 4:
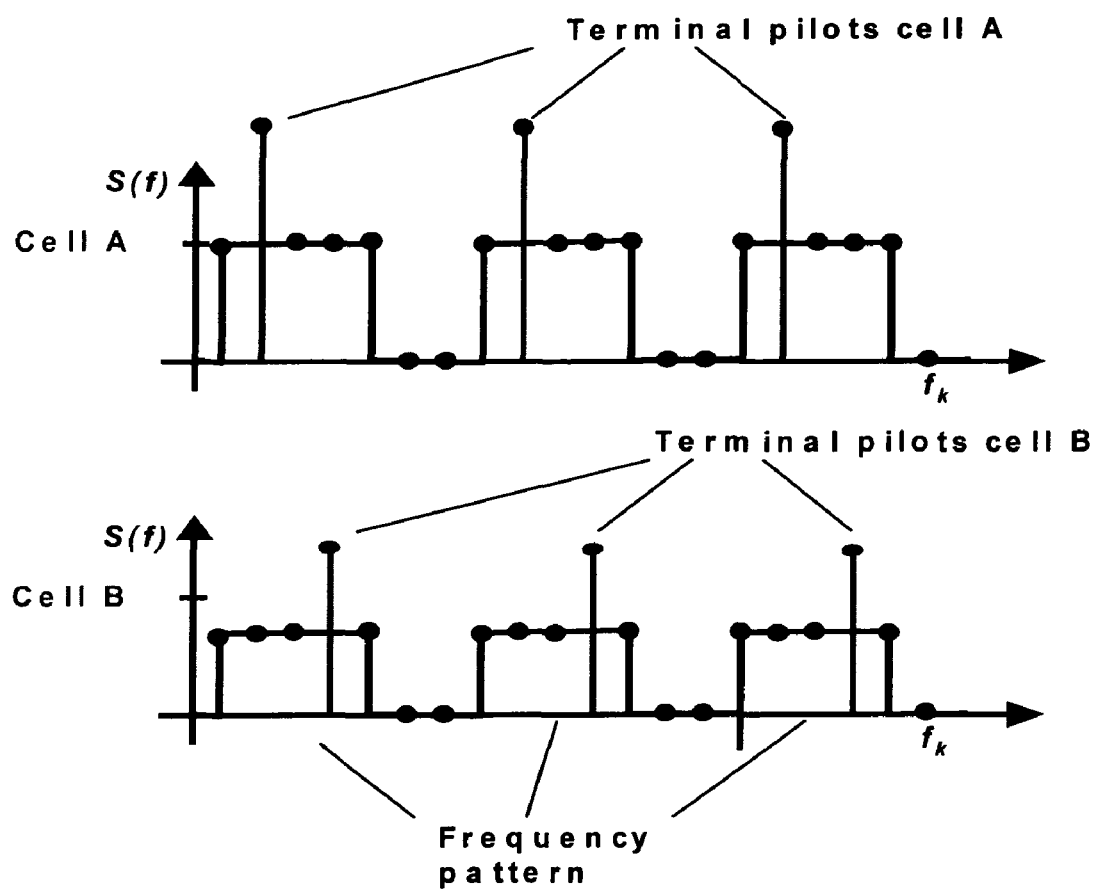
FIG. 4 schematically shows the cell specific uplink pilots in OFDM transmission.

In FIG. 4, for frequency patterns, i.e. subsets, along the frequency axis f, the signal levels are depicted along the signal axis S(f). In each frequency pattern, there is a terminal pilot having an amplitude level different from the absolute amplitude level used for data transmission.

In the upper part of FIG. 4, the frequency patterns for a cell A and in the lower part, the frequency patterns for a cell B are depicted. The terminal pilots have different positions on the frequency axis for the frequency patterns in cell A and cell B, which can be used to identify the serving cell of a mobile terminal.

In another embodiment of the invention for a single carrier FDMA system the cell identification can be realized by using training sequences in uplink that are cell specific.

Now, if e.g. mobile terminals gather at the border between two cells, the cell uplink subsets have to be distributed between mobile terminals of the two cells by a central functionality or by negotiation between the base stations.

For that case an allocation of subsets on a demand basis is described afterwards.

The base station NodeB B identifies from which cell on which subset at what time an interference comes and with what strength or damage it comes. It then contacts the serving base station for an identified maybe worst disturbing cell, e.g. base station NodeB A, e.g. via the RNC or directly with a report. With that information or further information about its mobile terminals such as geographic information, the base station NodeB A is able to find out from which of its mobile terminals the interference was sent out by means of looking at its history and influences or adjusts the interfering mobile terminal T1. Approximations to this ideal selection or identification are possible in approximative solutions which need less signaling and storage effort.

FIG. 3 shows a mobile terminal T1 in cell B1 at the border to cell B2 served by the base station of cell B1.

Now if the mobile terminal T1 wants e.g. more resources, the base station of cell B1 is notified. It either gives the mobile terminal T1 the resource, e.g. a subset or power, and waits for complaints e.g. from neighbor base stations, or it asks according to a decision process the identified base station which reported for the mobile terminal T1 the highest interference damage, in our example the base station of cell B2 if it can give away a resource in a big outer part of its cell.

Now, the base station of cell B2 accepts the request taking into account network criteria, i.e. factors such as the available subsets, load situation in the cells, service type, priority and quality of service and decides e.g. to accept a restriction in a dedicated subset.

Thus, the base station of cell B2 accepts a high interference level in reception of the dedicated subset dependent on said network criteria, so that mobile terminals in cell B2 can use the dedicated subset for uplink transmission only if they can surpass that interference level, e.g. because they are near to the antenna of the base station of cell B2 and can be scheduled with sufficient power for the dedicated subset. In other words, the dedicated subset is burdened by interference in cell B2 and its use is restricted in cell B2 under observation of the strong inter-cell interference inside the cell B2. The base station of cell B2 does not send interference damage reports with request for interference reduction to the mobile terminals of cell B1, or in the approximative solution that uses mobile terminals reacting on downlink measurement, a request for interference reduction to the base station of cell B1.

In an embodiment of the invention, if mobile terminals from cell B2, e.g. located at the cell border to cell B1, are measured to interfere on the base station of cell B1, the base station of cell B1 reports this to the base station of cell B2 with the measured strength and said mobile terminals from cell B2 get further a power limitation in the dedicated subset for transmission which can practically mean that the dedicated subset is removed in said mobile terminals from cell B2 for uplink transmission. This report has now high priority over e.g. other reports to use a subset.

In an embodiment of the invention, if the base station of cell B1 needs to remove the interference from multiple surrounding cells in the dedicated subset, it has to ask further base stations, typically of all further neighbor cells B3 and B4, for a restriction in the dedicated subset for mobile terminals that do interfere. So in the uplink, mobile terminals of said further neighbor cells are power limited if they interfere on the base station of cell B1, but the further neighbor base stations are not necessarily impacted by a high interference level from the outside.

Thus, the restriction means that e.g. the base station of cell B3 schedules the mobile terminals in uplink so to not generate interference in the dedicated subset on the neighboring base station of cell B1. So interference damage reports from the base station of cell B1 are obeyed to a certain extent. This affects only the mobile terminals that interfere on the base station of cell B1 and are near to the border to cell B1. The rest of the mobile terminals remain unaffected. So the mobile terminals are rescheduled to another subset or the power of the mobile terminals in the dedicated subset is reduced.

The request for restriction generally has to be followed to a considerable extent. This can go on until a minimum throughput for the group of mobile terminals that interfere on the base station of cell B1 is reached. Then a further reduction may be demanded too much. If the transmission strength from a mobile terminal e.g. located in cell B3 to the serving base station of cell B3 is stronger than on the neighbor base station of cell B1, a further power reduction can not be demanded. If the transmission strength to the neighbor base station of cell B1 is stronger than to the serving base station of cell B3, a further power reduction can be expected and then it is also time for a hand-over to the base station of cell B1. If due to that the power in the mobile terminal located in cell B3 is too small, the connection may break or the throughput is very little.

In an embodiment of the invention, if mobile terminals from cell B2 do not make interference in the base station of cell B1 anymore, this is told to the base station of cell B2 and the power limitation in the dedicated subset is relaxed or removed again. Further if a mobile terminal T1 in cell B1 at the border to cell B2 does not need the dedicated subset anymore, the mobile terminal T1 is no longer scheduled on the dedicated subset. Then the base station of cell B1 tells the base station of cell B2 that it gives back the resource. This means that the base station of cell B2 no longer accepts a high interference level in the dedicated subset anymore and it reports on interference in the dedicated subset to the base station of cell B1. Thus, in the base station of cell B1, according to interference damage reports sent from the base station of cell B2, the mobile terminal T1 is scheduled on another subset. Furthermore, the base station of cell B1 can also stop to ask the surrounding base stations of further neighbor cells B3 and B4 for avoidance of interference by their terminals in the dedicated subset, which relieves the restrictions in the further neighbor cell mobile terminals.

This way the resources can be dynamically distributed and an interference coordination on demand can be achieved.

If a mobile terminal in cell B2 is also at the cell border to cell B1, the mechanism can also be applied the other way round, so that e.g. in the end the whole frequency band will be distributed between the mobile terminal in cell B2 and the mobile terminal T1 in cell B2, e.g. as one half for each mobile terminal.

Regarding the power regulation of the mobile terminal T1, there are two strategies possible.

According to the first strategy, the mobile terminal T1 has sufficient power to surpass all interference even if the distance to the antenna of its serving base station in cell B1 gets larger. Then the power can be increased further. The disturbed or affected base stations, as e.g. the base station of cell B2, will send complaints to the serving base station of cell B1. So the disturbed or affected base stations have to be asked to give away a resource, e.g. the dedicated subset.

If a disturbed or affected base station does not want to give a resource, the uplink power in the mobile terminal T1 has to be decreased, the throughput gets lower and the connection may also break.

If a disturbed or affected base station gives the resource, the complaints will no longer be sent by the disturbed or affected base station and are settled. So the mobile terminal T1 can operate as desired.

According to the second strategy, the mobile terminal T1 has not sufficient power to surpass the interference if the distance to the antenna of its serving base station in cell B1 gets larger. Then an affected base station has probably to be asked for a resource, e.g. the dedicated subset, and further the interference in the dedicated subset has to be removed from all further neighbor cell's mobile terminals by a restriction in the dedicated subset for interfering mobile terminals.

If the resource is not given by a disturbed or affected base station or if the further neighbor cells B3 and B4 do not accept the restriction sufficiently, the interference is not reduced, the throughput gets lower and the connection may also break.

If the resource is given by a disturbed or affected base station and the further neighbor cells B3 and B4 accept the restriction sufficiently, the interference goes away with most of the further neighbor cells not being burdened by much interference on their own. So the mobile terminal T1 can operate as desired.

In the above part, the ideal case has been described with the assumption of a signaling of the interference damage and evaluation of history in the base station to identify the interference causing mobile terminal T1. One could also assume other mechanisms to identify the interference causing mobile terminal T1.

Therefore, now variants of the technique with approximations to the ideal case shall be described which can avoid the need for signaling the interference damage and subset and the evaluation of the history.

In an embodiment of the invention, regarding the identification in a decision process of the base station of the cell B2 where the considered mobile terminal T1 causes the highest interference, the mobile terminal T1 approximatively predicts on its own in advance where it will create interference damage based on the approximation that its downlink interference or path loss measurement is reciprocal to its uplink interference generation.

In an embodiment of the invention, regarding the decision which mobile terminals in which neighbor cells to ask for a reduction or limitation of emitted interference on the dedicated subset, in an approximation, it is just considered over all subsets using the pilots of all subsets from which cell, i.e. all its mobile terminals, the interference in average with what strength is emitted. The cell's base station with the highest interference emission is e.g. contacted first. Further also topological information could be used.

In an embodiment of the invention, regarding the resource restriction implied on mobile terminals that are measured to interfere in the base station of cell B1, the mobile terminals will on their own predict in advance where they will create interference damage based on the approximation that their downlink interference or path loss measurement is reciprocal to their uplink interference generation. So a mobile terminal will then signal its serving base station the measurements about the downlink reception strength and which base station the highest downlink reception strength is related to. Only when the reception strength related to the base station of cell B1 is high enough, the mobile terminal is accordingly power restricted in the dedicated subset to avoid interference on the base station of cell B1. This also results in a reduction of the uplink interference in the dedicated subset on the base station of the cell B1 and does not need signaling between the base stations.

Thus the methods do not need signaling between base stations to identify interfering terminals and they do not need scheduling history storage.

With the proposed uplink interference coordination on demand, all frequencies are rather unaffected in the inner area of a cell. Restrictions by coordination only take place in the border area of a cell.

Thus, the throughput is increased by the interference coordination on demand.

By using the method according to the invention, an OFDM system or a single carrier FDMA system can have full cell coverage for all and especially moving mobile terminals. Comparing to a solution, equivalent to CDMA transmission, where there is a different frequency hopping in different cells and only a small fraction of typically $\frac{1}{16}$-$\frac{2}{16}$ of all patterns can be used for all mobile terminals at the cell border, the method according to the invention promises higher throughput by this coordination on demand.

So with this solution in an orthogonal, e.g. OFDM or FDMA, up-link scheme the resources are allocated to a mobile terminal where the mobile terminal needs them. If one would theoretically concentrate resources on one mobile terminal, the range of this terminal in uplink could be considerably extended also outside the cell border.

Compared to a network power planning, the coordination on demand offers higher flexibility e.g. if a lot of mobile terminals gather in a geographic location at the cell border.

Further the solution helps in avoiding the need for macro diversity since the serving range of the mobile terminal is increased.

The invention claimed is:

1. A method for coordination of the interference in the uplink between cells of a single frequency network with the frequency band used for uplink being subdivided into at least two subsets comprising:
   allocating a resource related to a dedicated subset to a mobile terminal located in a first cell of said cells in the border area to a neighbor cell;
   a base station of the first cell asking a base station of another cell of said cells that experiences the highest interference damage caused by the mobile terminal to monitor said resource without soft handover;
   the base station of the cell with the highest interference damage caused by the mobile terminal accepting a high interference level on said dedicated subset dependent on network criteria including at least one of available subsets, load situation in the cells, service type, priority and quality of service; and restricting the usage of said dedicated subset in the cell with the highest interference damage caused by the mobile terminal under observation of the interference level, so that mobile terminals within said cell with highest interference can continue to use said dedicated subset for uplink transmission only if they can surpass the interference level.

2. The method according to claim 1, wherein if a mobile terminal located in the cell with the highest interference damage caused by the mobile terminal causes interference in the first cell, said mobile terminal located in the cell with the highest interference damage caused by the mobile terminal gets a power limitation dependent on network criteria on said dedicated subset or is not allowed to use said dedicated subset.

3. The method according to claim 1, wherein the usage of said dedicated subset is limited in power dependent on network criteria for mobile terminals located in neighbor cells of said first cell that cause interference in said first cell.

4. The method according to claim 1, wherein if the mobile terminal does no longer need the resource related to said dedicated subset, the usage of said dedicated subset in the cell with the highest interference damage caused by the mobile terminal is no longer restricted, and the base station of the cell with the highest interference damage caused by the mobile terminal no longer accepts a high interference level on said dedicated subset.

5. The method according to claim 1, further comprising:
the base station of a cell identifies by means of dedicated cell specific signals transmitted from mobile terminals from which other cell an interference in a subset stems from,
said base station sends to the base station of the cell from which said interference stems from a notification about the interference; and
said base station of said cell from which said interference stems from finds out which mobile terminal caused the interference by means of its history or further information about its mobile terminals.

6. The method according to claim 1, further comprising:
the base station of a cell identifies by means of dedicated cell specific signals transmitted from mobile terminals from which other cells interference in average stems from; and
the base station asks the base stations from which cells high interference in average is caused to limit the power in the dedicated subset for mobile terminals that cause interference in the cell.

7. The method according to claim 1, further comprising:
a mobile terminal evaluates in which cell it creates interferences by means of downlink interference or path loss measurements; and
said mobile terminal signals to its serving base station said measurements or results deduced from said measurements.

8. A base station for coordination of the interference in the uplink between cells of a single frequency network with the frequency band used for uplink being subdivided into at least two subsets wherein the base station comprises:
means for scheduling a resource to a mobile terminal that said base station serves;
means for receiving an identification of another base station that experiences the highest interference damage caused by said mobile terminal; and
means for asking said other base station to monitor said resource that will be used by said mobile terminal without soft handover;
the another base station including means for accepting a high interference level on said dedicated subset dependent on network criteria including at least one of available subsets, load situation in the cells, service type, priority and quality of service, so that mobile terminals within said cell with highest interference can continue to use said dedicated subset for uplink transmission only if they can surpass the interference level.

9. The base station according to claim 8, further comprising:
means for identifying by means of dedicated cell specific signals transmitted from mobile terminals from which other cell an interference stems from;
means for sending to the base station of the cell from which said interference stems from a notification about the interference; and
means for finding out by means of its history or further information about its mobile terminals from which mobile terminal the interference was caused.

10. A mobile network including base stations for coordination of the interference in the uplink between cells of a single frequency network with the frequency band used for uplink being subdivided into at least two subsets, the mobile network comprising:
a first base station including means for asking another base station in the mobile network experiencing the highest interference damage caused by a terminal the first base station serves to monitor a resource without soft handover;
means for scheduling said resource to said mobile terminal that said base station serves; and
the another base station including means for accepting a high interference level on said dedicated subset dependent on network criteria including at least one of available subsets, load situation in the cells, service type, priority and quality of service, so that mobile terminals within said cell with highest interference can continue to use said dedicated subset for uplink transmission only if they can surpass the interference level.

* * * * *